United States Patent

Medicus et al.

[11] 3,787,781
[45] Jan. 22, 1974

[54] EXTERNAL CATHODE/INTERNAL ANODE FIGURE EIGHT LASER

[75] Inventors: Gustav K. Medicus; Onezime P. Breaux, both of Dayton, Ohio

[73] Assignee: The United States of America as represented by the Secretary of the Air Force, Washington, D.C.

[22] Filed: Aug. 7, 1972

[21] Appl. No.: 278,330

[52] U.S. Cl............. 331/94.5 D, 313/210, 313/217, 313/356, 331/94.5 G
[51] Int. Cl................................................ H01s 3/02
[58] Field of Search..... 313/209, 210, 217, 32, 356, 313/216; 331/94.5 D, 94.5 G, 94.5 PE

[56] References Cited
UNITED STATES PATENTS
3,496,489  2/1970  Lin................................. 331/94.5 G

OTHER PUBLICATIONS

"Continuous Generation of Coherent Radiation in a Discharge in Zn and Cd Vapors Obtained by Cathode Sputtering," by Karabut et al.
Soviet Physics – Technical Physics, Vol. 14, No. 10, April 1970, pp. 1447–1448.

Primary Examiner—H. K. Saalbach
Assistant Examiner—Richard A. Rosenberger

[57] ABSTRACT

A transverse-discharge slotted hollow cathode gaseous laser having an external cathode with the anode contained within the confines of the cathode provides an easily cooled, stabilized (non-thermionic-emitting) cold-cathode, rugged, "all metal" laser.

2 Claims, 14 Drawing Figures 3,787,781

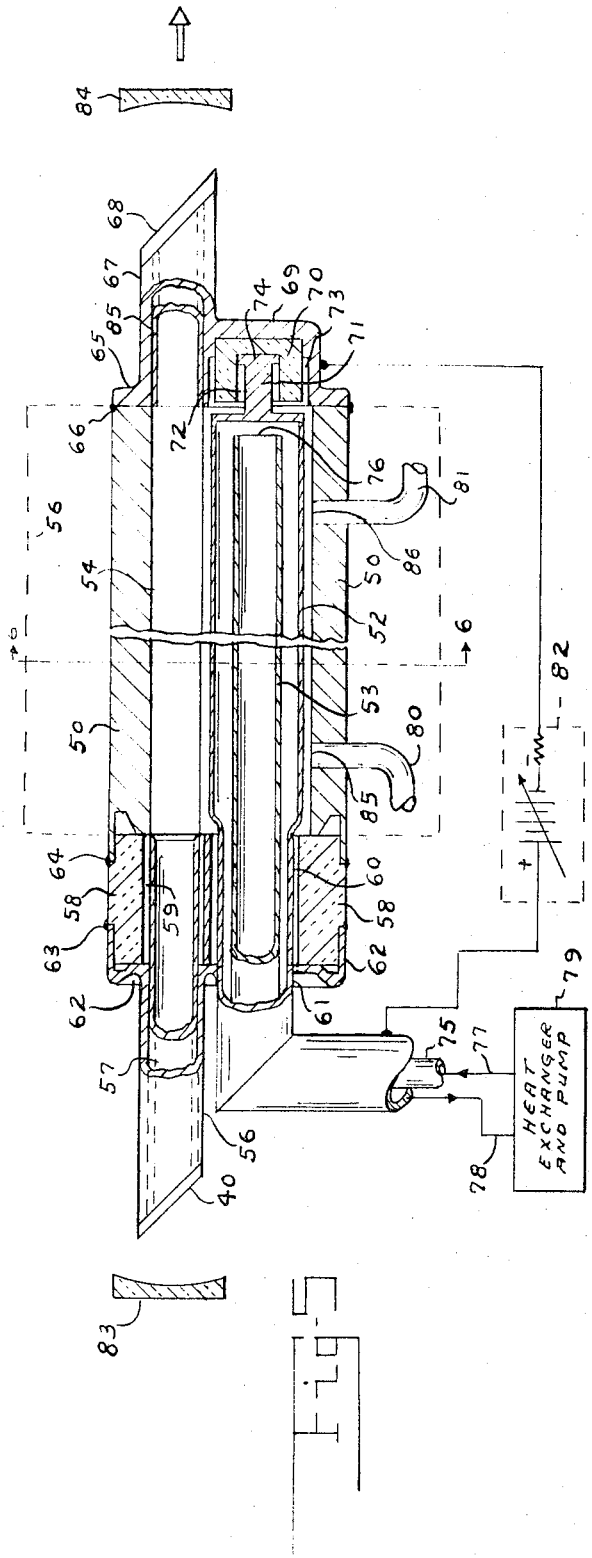
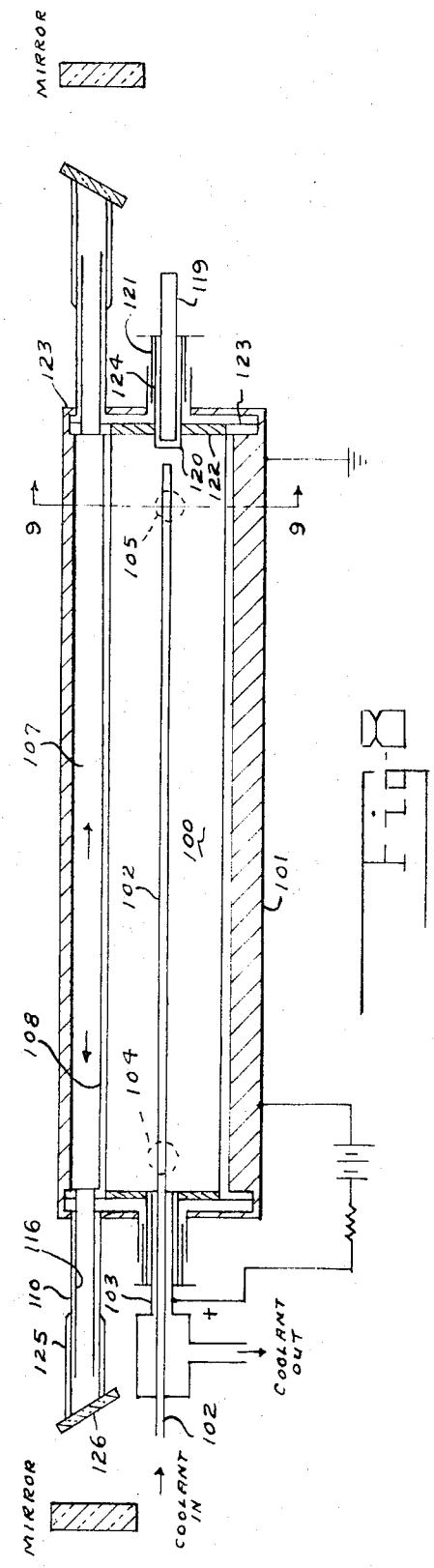

EXTERNAL CATHODE/INTERNAL ANODE FIGURE EIGHT LASER

BACKGROUND OF THE INVENTION

The field of the invention is in the art of gaseous lasers.

Prior art devices are exemplified by the patent "Gas Laser Tube Having A Hollow Elongated Cathode Electrode," U.S. Pat. No. 3,396,301, patentees Haruhiro Kobagashi et al., and the paper "Transverse-Discharge Slotted Hollow-Cathode Laser" by W. K. Schuebel appearing in IEEE Journal of Quantum Electronics, Vol. QE-6, No. 9, September 1970, pp. 574–575.

Generally these prior art devices have been quite limited in power capabilities due to the inaccessibility of the cathode for cooling with the tendency of the cathode to overheat with the resultant thermionic emission leading to "hot-spot" formation, instability, and eventual destruction of the laser tube.

SUMMARY OF THE INVENTION

A laser in which the cathode structure substantially forms the gas chamber and has a cross-section outline configuration approximately in the shape of a figure 8 with the anode located in one of the lobes of the 8 provides an easily cooled gaseous laser.

BRIEF DESCRIPTION OF THE DRAWING

FIG. 5 is representative pictorial view, in partial length section, of an embodiment of the invention;

FIG. 8 is a schematic length section view of another embodiment;

DESCRIPTION OF THE PREFERRED EMBODIMENT

Figure 1:
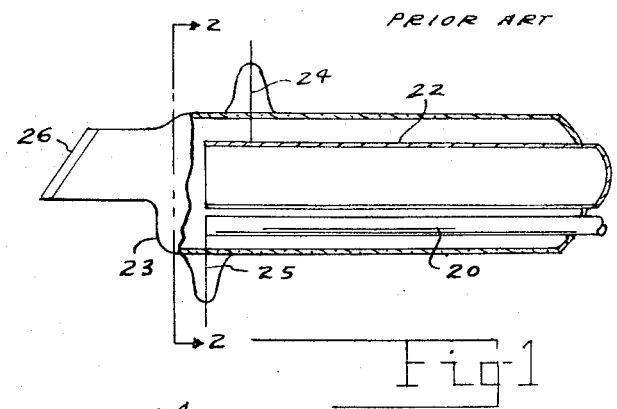
FIG. 1 is a representative pictorial partial length section view of a prior art slotted hollow cathode laser.
Figure 2:
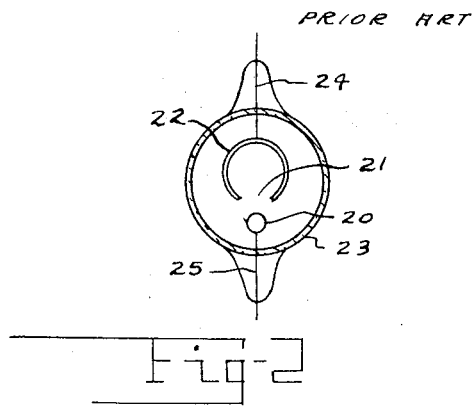
FIG. 2 is a representative cross-section view of the prior art laser shown in FIG. 1.

In one of the prior art devices (U.S. Pat. No. 3,396,301) as shown schematically in FIGS. 1 and 2 the cylindrical anode 20 runs parallel to the slot 21 of the cylindrical hollow cathode 22. Both the anode and cathode are enclosed in the glass tubular container 23. The electrical leads 24 and 25 are also supports for the electrodes. Although not shown, they are generally duplicated at the other end of the tube. The leads and the windows (the window 26 is shown, another window is at the other end of the tube) are attached to the glass envelope 23.

Figure 3:
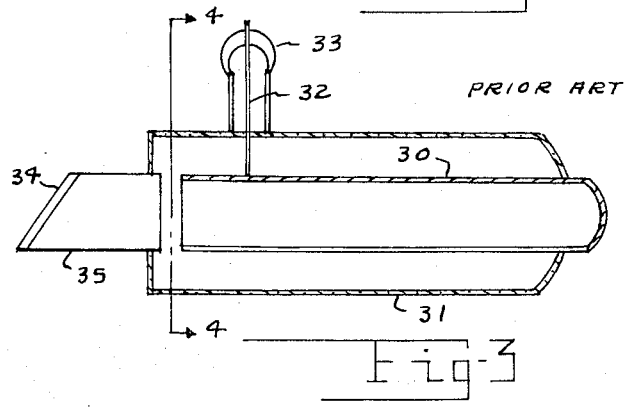
FIG. 3 is a representative pictorial partial length section view of another prior art slotted hollow cathode laser.
Figure 4:
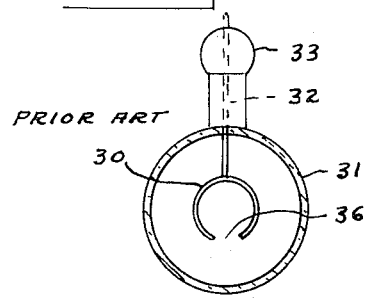
FIG. 4 is a representative cross-section view of the prior art laser shown in FIG. 3.

In another prior art device as taught by Schuebel (previously referenced), the arrangement in length section and cross section is shown in FIGS. 3 and 4. In this device the slotted hollow cathode electrode 30 is enclosed in the anode electrode 31. The anode 31 also serves as the gas container. The cathode 30 is supported by electrical leads 32 (only one shown) passing through insulators 33 attached to the anode structure. The windows 34 are attached to extension tubes 35 attached to the anode structure. (Only one end of the tube is shown.) The slot 36 provides a path for the transverse discharge between hollow cathode and the anode.

In the prior art devices the cathode is not easily accessible for cooling and in many instances the overheating of the cathode with the resulting warpage, sagging, and melting is a problem that seriously limits their use. This is particularly true with lasers that utilize gases that are capable of utilizing higher currents and providing higher outputs such as the argon-ion laser.

Figure 6:
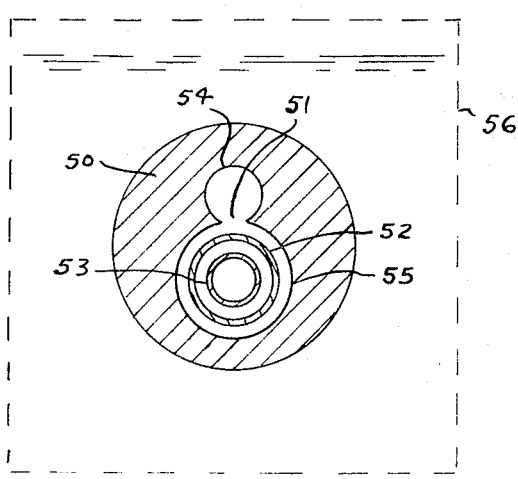
FIG. 6 is a cross-section view of the embodiment shown in FIG. 5.
Figure 7:
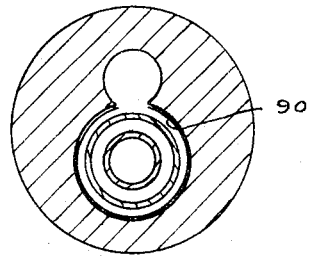
FIG. 7 is a partial cross-section view of an embodiment similar to that shown in FIGS. 5 and 6 except having an insulating coating over part of the cathode.

FIGS. 5 and 6 show in length partial section and in cross section an embodiment of the invention. The basic structure of the invention may best be understood from first considering the cross-section view of FIG. 6. The structure 50 forming the cathode is fabricated from solid cylindrical stock to provide an interior surface in the shape of a figure 8 with a slot 51 between the lobes of the "8." It may either be bored out or formed in halves (through a vertical centerline and then welded together). Stainless steel has been found to be a suitable material than can be used throughout in the construction of the laser except for the insulating materials and the laser windows. The anode 52 in this embodiment is hollow and has a central tube 53 so that a flow of cooling medium may be used to cool the anode. The cathode 50, having the figure 8 cathode surface, consists electrically of two cathode surface areas, the surface 54 comprising the hollow cathode proper, i.e., the active part of the cathode in which the plasma and laser action occurs, and the inactive part of the cathode 55 which envelopes the anode 52 except for the slot. The complete cathode 50 is readily cooled either by air flow over the structure or by immersion of that part of the cathode containing the active area in a liquid coolant tank 56. Water is a suitable cooling medium for cooling both the cathode and anode. It is desirable to either make the distance between the anode 52 and the inactive part of the cathode 55 sufficiently small, or to coat this part of the cathode surface with an insulating material 90 as shown in FIG. 7, in order to avoid significant plasma formation resulting from electron impact on the gas in the inactive part of the cathode. Constructed in this manner the current between the anode 52 and the inactive part of the cathode 55 will remain negligible compared to the current flowing from the anode 52, through the slot and the plasma inside the hollow cathode, to the cathode surface 54. Filling the space between the anode and cathode (obviously, except for the slot) with insulation has been found to be not desirable due to a build up of material by sputtering action on the exposed surface of the insulation at the edge of the slot resulting in breakdown or flash-over through the substantial short formed by the sputtered particles on the insulation.

The following construction details referring to the embodiment shown in FIGS. 5 and 6 (and FIG. 7 when an insulating coating is used) are set forth as an example in practicing this invention. The metallic tubulation 56, having laser window 40 sealed thereto, is lined with the insulating tube 57 which protrudes into the body insulator 58 providing a gap 59 between insulators 58 and 57. The lining of the metal tube 56 with the insulating tube 57 is necessary to prevent a discharge taking place from inside the metallic tube 56 to the cathode. A gap 59 between the face of the cathode body 50 and the insulating tube 57 and a gap 60 between the anode lead 61 and insulator 58 are provided for sputter protection. Flange 62 to which the tube 56 and anode lead 61 are sealed is sealed to insulator 58 along seam 63, and the insulator 58 is sealed to the cathode body 50 along seam 64.

At the other end of the laser tube, the flange 65 is sealed to the cathode body 50 along seam 66. Attached in sealing relationship to the flange 65 is the tubulation member 67, with laser window 68 sealed thereto, and the socket receptacle 69 for the cup-shaped insulator 70 which supports the anode 52 by means of the protrusion 71 attached to the anode. This protrusion 71 fits into the blind hole of insulator 70. A gap 72 is made between anode protrusion 71 and insulator 70, and a gap 73 is made between the portion of the flange 65 and insulator 70 that surrounds the anode protrusion 71. These gaps, like the previously mentioned gaps, serve as sputter protection in that no short-path continuous insulator surface is present for sputtered particles to settle out on and tend to short out the electric potential. Anode protrusion 71 has small circular flange-shaped member 74 which contacts the very bottom of cup-shaped insulator (bottom and inner periphery) which provides the actual physical support for this end of the anode structure. The tube 67 is also lined with insulating tube 85 to prevent the metallic tube 67 from acting as a hollow cathode and supporting a discharge.

The hollow anode lead 61 is sealed to the anode proper 52 and to the flange 62; the anode lead 61 is made somewhat smaller than the actual anode 52 due to physical requirements in providing the insulating structure and to provide a lack of interference with the tubulation member 56. The anode lead 61 contains the coaxial tube 75 whose open end 76 lies near the closed end of the anode. i.e., the end having the protrusion 71. With this arrangement coolant 77 enters through the bore of coaxial tube 75, emerges from the open end 76 of the tube, flows along the inside of the anode 52, emerges from between the coaxial tube 75 and the inside of the hollow anode lead 61, from which it flows 78 to the heat exchanger and circulating pump 79. Attached to the cathode body 50 is the gas port tube 80. This tube connects to the gas charging system and pump. With some lasing gases it is quite desirable to have a flowing gas or be able to purge the laser tube. In these situations a second port tube 81 is provided at the opposite end of the laser tube so that a flow of gas through the laser may be provided. At the inside ends 85 and 86 of the port tubes a fine mesh screen (200 × 200 mesh nickel, is suitable) is used to provide a uniform cathode to anode spacing and to prevent any hollow cathode action within the port tubes. Conventional power source 82 provides the direct current potential for the transverse discharge slotted hollow cathode gaseous laser. Conventional totally reflective mirror 83 and partially reflective mirror 84 complete the conventional laser optical system.

Figure 9:
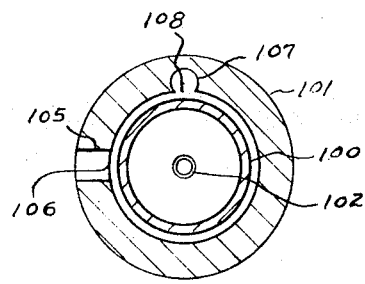
FIG. 9 is a partial cross section, through one of the gas ports of the embodiment of FIG. 8.
Figure 10:
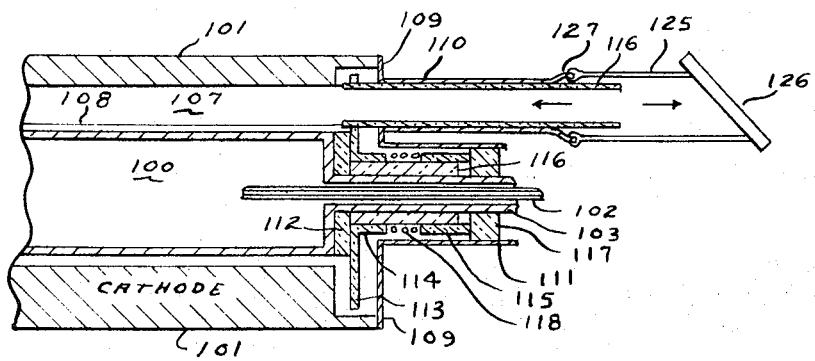
FIG. 10 is a more detailed schematic partial length section of the coolant flow end of the embodiment of FIG. 8.

Another embodiment of the invention having a cylindrical stock cathode is shown in FIG. 8 in schematic form, the partial cross section is shown in FIG. 9, with a detailed section view of the end of the laser which has the coolant ingress and egress is shown in FIG. 10. In this embodiment the hollow cylindrical anode 100 is concentric with the central axis of the cylindrical cathode 101. The anode coolant enters through tube 102 and leaves the anode through tube 103 which is contiguous with the anode and provides electrical contact to the anode. The inlet and outlet gas ports 104 and 105 through the cathode wall have a fine mesh metallic screen (200 × 200 mesh nickel has been found to be suitable) 106 shaped to conform with the inner periphery of the cathode surface so as to maintain a substantially uniform cathode-anode spacing between the anode and the nonactive area of the cathode to prevent any ionization formation in th port area. As previously indicated, with all embodiments of this invention it is desirable to prevent any discharges from taking place except in the active hollow cathode 107 and through the slot 108 to the anode area directly opposite the slot. It is also desirable that within the laser tube that all path lengths from the anode to cathode over insulating materials be relatively long and relatively inaccessible over at least a portion of their length to sputtering deposits so that any sputtered particles will not short out the tube and materially decrease its useful life. FIG. 10 shows a detailed schematic cross section of a typical coolant end of an embodiment of the invention. The metallic cathode 101 has metallic plate end member 109 and metallic tube members 110 and 111 all in contiguous, welded, relationship, and hence all at cathode potential. Tube 103, and of course anode 100, are at anode potential. Thus, insulating members (quartz or alumina is suitable) disc 112, disc 113, tube 114, tube 115, and tube 116, are used to prevent undesirable discharges and sputtering deposits. Conventional glass tube 125 with laser window 126 attached is conventionally sealed to the slightly flared end 127 of tube 110. Feedthrough insulator 117 is bonded both to tube 111 and tube 103. Conventional insulating feedthrough insulators such as Ceramaseal type 804B2779-8, have been used satisfactorily for the portion of the seal comprising insulator 117 and sections of tubes 103 and 111. The spring member 118 maintains a small pressure on tube 114 and discs 112 and 113 holding them in engaging relationship and disc 112 against the end of the anode during any thermal changes that may occur. The other end of this embodiment is similarily constructed except that metallic anode rod supporting member 119 fits in circular recess 120. Rod member 119 is sealed to insulating member 121 like tube 103 to insulator 117. Insulating discs 122 and 123, and insulating tube 124 all function similarly to discs 112, 113 and insulators 116 and 117. Both ends of the laser tube may be of similar construction except for the coolant tubes at the one end being replaced with a rod seated in a recess in the anode at the other end of the tube.

With gas pressures of approximately one Torr, anode to cathode spacing from about 1/16 to 1/32 inch have been found to be satisfactory so as to not present undue construction difficulty and yet not be so large that a discharge forms between them. As previously mentioned an insulating coating such as a 10 mil coating of Ceramacoat type 512 deposited on all inactive cathode surfaces aids in preventing the formation of undesirable discharges. At other gas pressures the distance between the cathode and anode should be varied accordingly so that the pressure-distance (pd) product remains substantially constant within the range enumerated.

Stainless steel is the preferred material for the metallic members of the device. The insulating tube may be quartz, alumina or other conventional high temperature insulating materials. Conventional high vacuum feedthrough insulators such as the Ceramaseal type previously mentioned may be used. In addition to the previous enumerated structural means for preventing unwanted discharges the cavities at the ends of the tube around the anode may be packed with alumina wool to provide further insulation.

One example of particular operating embodiment of the invention constructed as shown in FIGS. 8, 9 and 10 had an outside cathode cylindrical stock diameter of approximately 1 ½ inches, an active cathode surface diameter of approximately ¼ inch, a slot width of approximately 0.060 inch and an anode diameter of approximately ¾ inch in an inactive cathode bore diameter of approximately ⅞ inch. The lasing gas was an 8 to 1 helium-neon mixture at a nominal pressure of approximately 1 Torr. No coating of the anode or cathode was necessary or used. The end cavities around the anode were packed with alumina wool. The anode was cooled by a flow of cooling water and the cathode body was immersed in a water bath. Typical anode-cathode voltages for this gas mixture at this pressure are from 200 to 250 volts. Conventional lasing action of the gas in the laser optical cavity comprising the optical path between mirrors was obtained. In this embodiment using He/Ne gas the laser could be driven to saturation with input transverse discharge currents of approximately 4 amperes in the slotted hollow cathode without any appreciable deterioration of the structure. Prior art slotted hollow cathode laser devices have had severe cathode warpage and deterioration with currents of approximately ½ ampere and destruction rapidly occurred with greater currents.

Figure 11:
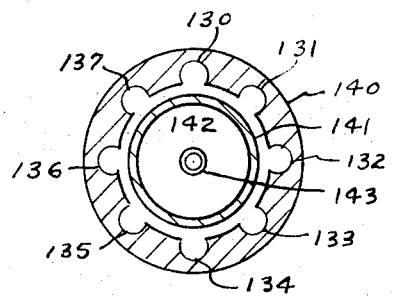
FIG. 11 is a cross-section view of a multi-cathode/single-anode embodiment.

FIG. 11 is a schematic cross section of multi-cathode/single-anode embodiment. The construction is similar to the single hollow cathode embodiment shown in FIG. 9 except multiple hollow active cathodes 130 to 137 are contained in the external cylindrical cathode structure 140. The cylindrical anode 141 is cooled by a coolant flow through the coaxial cavity 142 from inlet tube 143 similar to the previously described embodiments. The remaining structure of this embodiment is similar to the single cathode embodiments. In addition to providing parallel lasing operation with conventional laser lengths, series operation of the lasing cavities may be used to provide a great reduction in the overall laser assembly length, by having a plurality of reflecting mirror arrangements such that the optical path is folded back from one hollow cathode to and through another hollow cathode.

Figure 14:
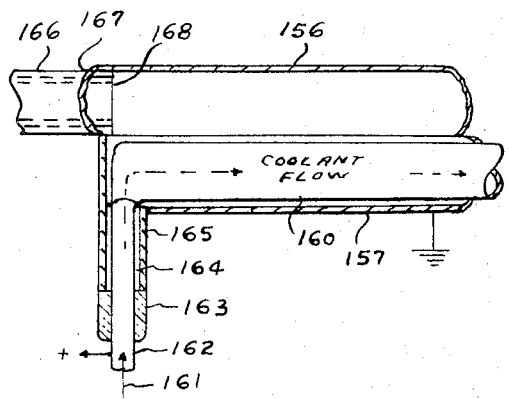
FIG. 14 is a schematic partial, length-section view of the embodiment shown in schematic partial cross-section in FIG. 13.
Figure 13:
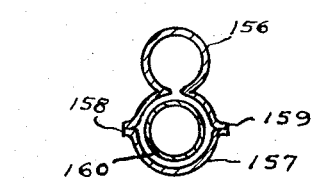
FIG. 13 is a schematic partial cross-section configuration view of another sheet-metal fabricated embodiment.
Figure 12:
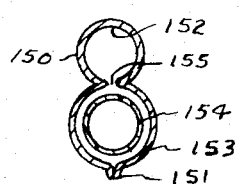
FIG. 12 is a schematic partial cross-section configuration view of a sheet-metal fabricated embodiment.

A more economical fabrication of an external cathode/internal anode hollow cathode laser than those fabricated from solid stock as previously described may be made from form metallic sheet material, such as stainless steel sheet, in the forms shown schematically in partial cross section in FIGS. 12 and 13. In the embodiment shown in FIG. 12 a length of sheet metal is formed to provide the external cathode 150. It is seam welded 151 to provide a gas tight enclosure. The active cathode area is the inside surface 152. The inactive part of the cathode surrounds the hollow cylindrical anode 154 except for the slot 155. Another easily fabricated sheet metal embodiment is shown schematically in partial cross section in FIG. 13. In this embodiment the external cathode is formed from two sheets 156 and 157 and welded together at the seams 158 and 159. The anode 160 is a cylindrical tube as in the previous embodiments except straight through, i.e., in one end, out the other, coolant flow is used as is shown in the partial length section schematic view of FIG. 14, and the coolant flow enters and leaves at right angles to the anode. In FIG. 14 only one end of the apparatus is shown; the other end is similarly constructed. The coolant flow 161 enters through tube 162 which is sealed to the anode 160. Insulator 163 has tubular member 164 extending through tube 165. Tube 165 is welded to the cathode structure 157. (A conventional commercially available feedthrough, as previously mentioned, may be used for this coolant entrance and lead assembly. Electrical contact to the anode is made through metallic tube 162. The ends of optical path in this embodiment are similar to that shown in FIG. 10. That is, metal tube 166 is welded 167 to the sheet metal structure 156 and has insulating tube 168 extending through the length of the metal tube 166 similarly to insulating tube 116 in metal tube 110 of FIG. 10. Metal tube 166 has an insulating tube, with laser window attached, conventionally attached as also shown in FIG. 10.

It is to be noted that with the laser electrode structures as disclosed herein that the temperatures of both the cathode and anode can be independently selectively controlled, that is, by controlling the temperature of the bath surrounding the cathode and controlling the temperature of the heat transfer medium circulated through the anode. Thus, heat may be first applied to an electrode to start a reaction and the temperature thereafter controlled to the degree desired. While the invention was created primarily for non-thermionic emitting "cold cathode" lasers, the electrode structure and apparatus may be used for controlled thermionic cathode emission by applying heat to the cathode. Likewise the anode may be operated by a relatively high temperature to provide a metal vapor lasing medium. The structure is extremely rugged, very flexible in operation so that it may effectively be used with many gaseous lasing mediums over a wide variety of temperature ranges and voltages.

We claim:

1. An electrode structure for use in a transverse discharge, gaseous laser comprising:
   a. an elongated tubular cathode electrode member having a cross section substantially in the form of the figure 8 with a slot between the lobes of the "eight";
   b. a tubular anode electrode member positioned in axial spaced apart relationship in one of the said lobes of the cathode member;
   c. an insulating material coated on the inner surface of the wall of the said lobe containing the anode;
d. means for providing a flow of heat transfer media through the said anode; and
e. means for providing electrical connection to the said anode and the said cathode.

2. The apparatus as claimed in claim 1 wherein the said means for providing electrical connection with the said anode cooperates with said means for providing a flow of heat transfer media.

* * * * *